United States Patent [19]

Larson

[11] 4,152,398

[45] May 1, 1979

[54] PROCESS FOR PRODUCING DEFLUORINATED PHOSPHATE ROCK GRANULES

[75] Inventor: Harold V. Larson, Houston, Tex.

[73] Assignee: Olin Corporation, New Haven, Conn.

[21] Appl. No.: 805,050

[22] Filed: Jun. 9, 1977

[51] Int. Cl.[2] .......... C01F 1/00; C01F 5/00; C01B 15/16; C01B 25/26

[52] U.S. Cl. .......... 423/167; 71/DIG. 3; 423/305

[58] Field of Search .......... 423/305, 307–313, 423/167; 71/DIG. 3

[56] References Cited

U.S. PATENT DOCUMENTS

| | | | |
|---|---|---|---|
| 2,562,718 | 7/1951 | Hollingsworth | 71/DIG. 3 |
| 2,997,367 | 8/1961 | Williams | 71/44 |
| 3,178,278 | 4/1965 | Manning | 71/DIG. 3 |
| 3,189,433 | 6/1965 | Hollingsworth | 71/DIG. 3 |
| 3,264,086 | 8/1966 | Hollingsworth et al. | 71/41 |

*Primary Examiner*—O. R. Vertiz
*Assistant Examiner*—Gregory A. Heller
*Attorney, Agent, or Firm*—William A. Simons; Thomas P. O'Day

[57] ABSTRACT

An improved process is described for preparing defluorinated phosphate rock (DPR) granules useful as animal feed from fluorine-containing phosphate rock.

10 Claims, 1 Drawing Figure

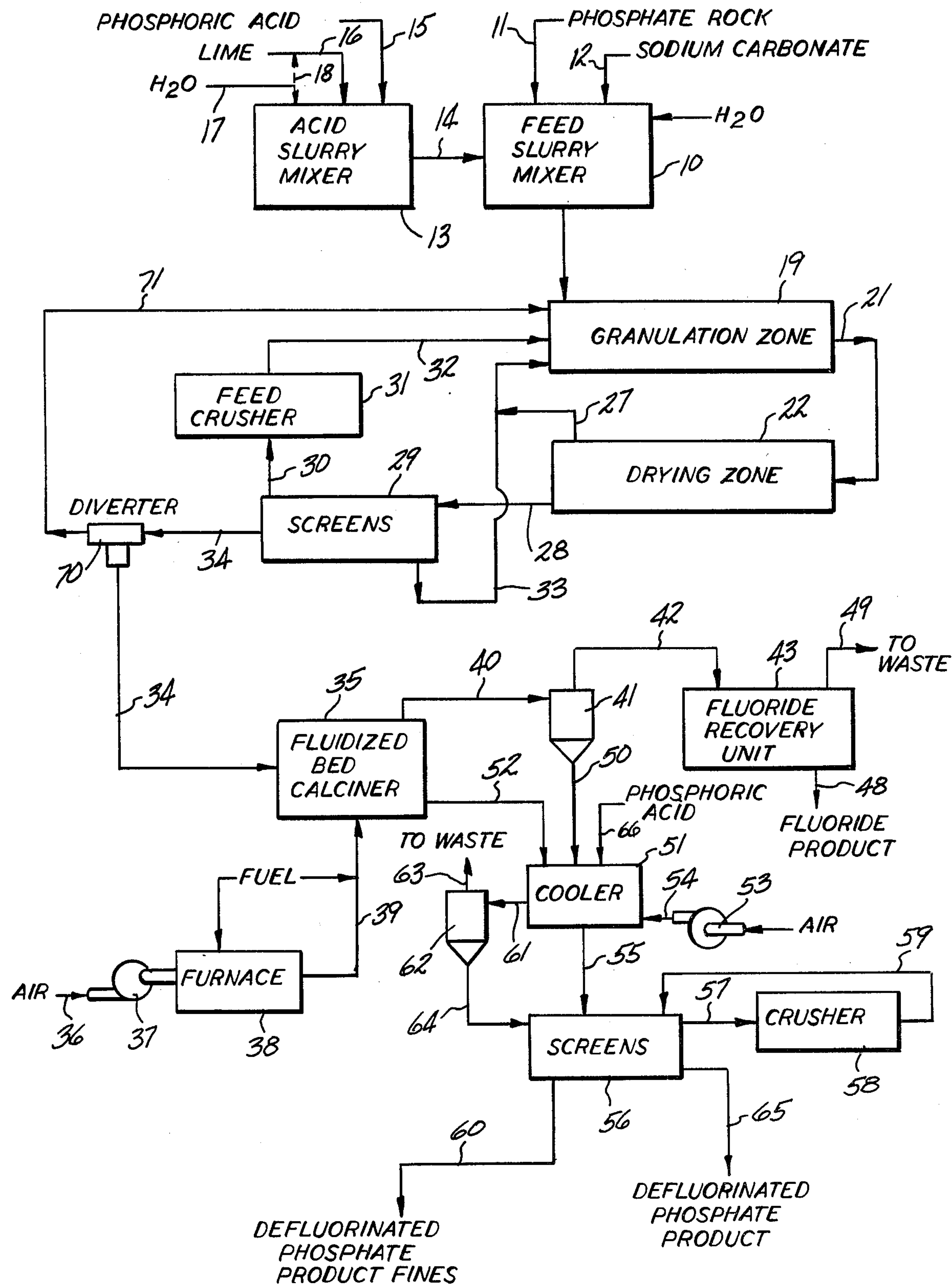
PHOSPHORIC ACID
LIME
$H_2O$
ACID SLURRY MIXER
PHOSPHATE ROCK
SODIUM CARBONATE
FEED SLURRY MIXER
$H_2O$
GRANULATION ZONE
FEED CRUSHER
DRYING ZONE
DIVERTER
SCREENS
FLUIDIZED BED CALCINER
FLUORIDE RECOVERY UNIT
TO WASTE
FLUORIDE PRODUCT
PHOSPHORIC ACID
TO WASTE
FUEL
COOLER
AIR
AIR
FURNACE
SCREENS
CRUSHER
DEFLUORINATED PHOSPHATE PRODUCT FINES
DEFLUORINATED PHOSPHATE PRODUCT

PROCESS FOR PRODUCING DEFLUORINATED PHOSPHATE ROCK GRANULES

BACKGROUND OF THE INVENTION

1. Field of the Invention

This invention relates to an improved process for preparing defluorinated phosphate rock granules that can be employed as animal feed from fluorine-containing phosphate rock.

2. Description of the Prior Art

Phosphate-containing materials are in great demand for use as animal feed supplements, and the market for such materials is constantly growing. The principal sources of phosphate in the United States are the great natural deposits of pebble rock and phosphate rock found in Florida and in the western states, and such widely distributed phosphatic materials as apatite. However, these naturally occuring phosphate materials contain combined fluorine in quantities which can, under certain conditions, be detrimental to health when used as animal feed supplements. As a result, when these phosphatic materials are to be used as animal feed supplements, the phosphatic material is commonly treated to reduce the fluorine content of the material usually below a specified minimum amount. For instance, the fluorine content of an acceptable animal feed supplement today should be less than one part of fluorine per 70 parts of phosphorus by weight. In addition, industry specifications require that the phosphorus content of the defluorinated phosphate rock be at least 18% by weight.

A great deal of effort has been devoted to the problems of developing economical and efficient processes for reducing the fluorine content to acceptable limits while maintaining an acceptable level of phosphorus content in these phosphatic materials (herein collectively referred to as phosphate rock). Thermal processes have been the most widely known and commercially successful means of defluorinating phosphate rock. A typical thermal process involves calcining the phosphate rock in the presence of phosphoric acid, sodium carbonate, water vapor and other reagents at a temperature in excess of about 1000° C. to drive off a substantial portion of the fluorine content of the rock and thereby obtain a defluorinated phosphate product. The principal difficulty encountered in the defluorination of phosphate rock by high temperature calcination arises from the fact that the temperature required for the removal of fluorine is so high that objectionable fusion or sintering of the rock can take place before removal of fluorine to the desired extent is effected. In order to avoid the disruption of the calcination process due to partial fusion and the consequent formation of large lumps of phosphate-containing material in the kiln or other calcining apparatus, it has heretofore been the practice to form the defluorination feed material into nodules, agglomerates, or granules having sufficient mechanical strength, porosity, and resistance to fusion to withstand calcination in a rotary kiln, and a great deal of time and effort have been expended in developing methods for making such a granulated feed material. The prior art practice of making defluorination feed material is exemplified by the processes described in U.S. Pat. No. 2,995,436 and U.S. Pat. No. 3,189,433 both issued to Hollingsworth et al, and co-pending U.S. patent application Ser. No. 761,049, filed Jan. 21, 1977 to Harold V. Larson.

However, the problem of containing defluorinated phosphate rock products that have the acceptable level of at least 18% by weight phosphorus content still remains. The supply of relatively pure phosphate rock concentrate, like many other raw materials today, is rapidly diminishing. Furthermore, costs have increased for phosphate rock concentrates which contain, for example, greater than about 72% BPL (Bone Phosphate of Lime) by weight and less than 4% by weight acid insolubles. In an effort to maintain acceptable profit levels, animal feed producers have resorted to using lower cost, less pure phosphate rock concentrate which contain, for example, from about 68% to 70% BPL by weight and from about 6% to about 10% acid insolubles by weight. Although such lower grade phosphate rock materials can be successfully defluorinated by conventional defluorination techniques, the excess acid insoluble content of the starting phosphate rock adversely dilutes the final product and makes it difficult to produce a defluorinated phosphate rock having a phosphorus content in excess of about 18% by weight.

Another problem facing animal feed producers is that in the heating or defluorination step, some of the $P_2O_5$ present in the raw material may unexpectedly volatilize off with the fluorine, and, therefore, the resulting phosphorus content may be lower than the acceptable 18% level.

To overcome these problems of phosphorus content deficiency in animal feed products, the industry has added increasing amounts of phosphoric acid to the phosphate rock concentrates. Normally, the phosphoric acid is added to the rock concentrate in a mixing step prior to the granulating and heating or defluorination steps. However, it has been realized that only so much phosphoric acid can be added prior to the heating step. If the relative amount of added phosphoric acid is too great, certain processing problems such as over-size defluorinated phosphate rock granules may result. Therefore, producers are limited by the amount of phosphoric acid they can add prior to the heating or defluorination step, and, in some instances, such resulting products are unfortunately below the 18% by weight phosphorus content requirement.

U.S. Pat. No. 3,264,086, issued to Hollingsworth et al. on Aug. 2, 1966 teaches treating certain phosphatic compounds with phosphoric acid to raise the phosphorus content therein up to 27% by weight. This treatment generally can be carried out by spraying phosphoric acid on dry phosphate raw material at a temperature not above 260° F. (127° C.). While this patent appears to teach an acceptable way of increasing phosphorus content in animal feed products, it has the drawback of being an additional processing step, and, therefore, increasing the cost of product.

The present invention is therefore directed toward an improved method for producing defluorinated rock which has an acceptable phosphorus content of at least 18% whereby additional phosphoric acid is added to defluorinated phosphate rock granules after the defluorination step. However, the present invention has the advantage of adding the phosphoric acid during an existing processing step, and, therefore, this addition will not raise the product cost excessively.

BRIEF SUMMARY OF THE INVENTION

It has now been discovered that the above-discussed problem of a phosphorus content deficiency in the final defluorinated granulated product can be solved for conventional processes which have the steps comprising:

(a) forming a mixture of fluorine-containing phosphate rock, phosphoric acid, sodium carbonate and water,
(b) granulating the resulting mixture,
(c) heating the resulting granules to a temperature to defluorinate said fluorine-containing phosphate rock without fusion whereby sufficient fluorine is evolved to produce defluorinated phosphate rock granules, said defluorinated phosphate rock granules having a phosphorus content of less than 18% by weight,
(d) cooling said heated defluorinated phosphate rock granules in a fluidized bed, and
(e) recovering said cooled defluorinated phosphate rock granules, wherein said improvement comprises:
adding phosphoric acid to said defluorinated phosphate rock granules during said cooling step when said granules are at a temperature from about 175° C. to about 400° C., the amount of said added phosphoric acid being sufficient to raise the phosphorus content of said granules to at least 18% by weight.

BRIEF SUMMARY OF THE DRAWING

The FIGURE is a schematic drawing of a typical fluidized bed calciner technique for preparing defluorinated phosphate rock granules showing the improvement of this invention.

DETAILED DESCRIPTION OF THE INVENTION

The present process employs as starting materials fluorine-containing phosphate rock, phosphoric acid, sodium carbonate, water, and preferably, other suitable reagents, to make defluorinated phosphate rock granules. Phosphoric acid, sodium carbonate and water are additionally employed in these types of processes because each has known beneficial effects. See U.S. Pat. Nos. 2,839,377; 2,916,372; 2,995,436; 2,995,437; 3,058,804; 3,078,156; and 3,364,008 for detailed discussions on the effects of these reagents.

The fluorine-containing phosphate rock employed in this invention includes any of the usual commercial products from a phosphate rock mill or concentrator. Generally, fluorine-containing rock concentrates containing from about 65% to about 78% BPL (Bone Phosphate of Lime) by weight and up to about 10% by weight acid insolubles (i.e., principally silica) can be employed herein. Such fluorine-containing rock normally also contains from about 0.5% to about 4% by weight fluorine, and, preferably, less than about 1.5% by weight each of $Al_2O_3$ and $Fe_2O_3$. However, fluorine-containing phosphate rock from other sources may be satisfactorily defluorinated in accordance with the process of this invention.

Suitably, all of the fluorine-containing phosphate rock of the present invention generally passes through about a 35 mesh Tyler standard screen. More preferably, a maximum of about 18% by weight of the fluorine-containing phosphate rock feed is retained on a 100 mesh screen and a minimum of about 50% by weight passes through a 200 mesh Tyler standard screen. All screen sizes presented throughout the specification and claims herein in terms of "mesh" refer to Tyler standard screens.

The phosphoric acid suitable for use as a reagent in the present invention may be any conventional wet-process phosphoric acid such as one having a $P_2O_5$ concentration in the range from about 24% to about 32% by weight and containing less than about 25% by weight of non-volatiles impurities based upon the $P_2O_5$ content. The phosphoric acid may be previously defluorinated, but need not be, since removal of the fluorine can be substantially effected by the subsequent heating step in the process of this invention.

In particular, crude commercial phosphoric acid resulting from reacting sulfuric acid with a phosphate-bearing material (e.g., phosphate rock) is a satisfactory form of phosphoric acid. While the concentration of the phosphoric acid employed herein is not critical, it should be sufficiently high to avoid unduly increasing the moisture content of the aqueous starting mixture. Alternatively, other acid phosphate compounds such as acidic sodium salts of phosphorus acids can also be successfully employed to replace all or part of the phosphoric acid.

The sodium carbonate employed as a reagent herein can be any commercially available product. The sodium carbonate is employed primarily as a preferred source of sodium and it should be recognized by those skilled in the art that other sodium compounds, such as sodium phosphate, sodium nitrate, sodium formate, sodium chloride and the like may be used to replace part or all of the sodium carbonate component. It will be recognized by those skilled in the art that the term "sodium carbonate" as used throughout the description and claims is intended to include any compound capable of providing $Na_2O$ under the reaction conditions obtained without adversely affecting the process. The preferred source of sodium carbonate for the present invention is commercially available soda ash which contains greater than 99% by weight $Na_2CO_3$ (58% by weight $Na_2O$) and substantially all of the particles pass through a 35 mesh screen.

Sufficient water is added to the reagents to provide an aqueous non-granulated feed slurry of fluorine-containing phosphate rock, phosphoric acid and sodium carbonate. This slurry normally will have a specific gravity in the range of from about 1.80 to about 2.00 and preferably from about 1.85 to about 1.95, and a water content in the range of about 25% to about 30% by weight. All or part of the water can be added with any of the three reagents or separately. The water employed to make up this aqueous slurry can contain minor impurities such as fluorine and aluminum as well as calcium and phosphate values. Therefore, aqueous waste streams from other phosphate processes may be employed herein.

Other reagents conventionally employed in making defluorinated phosphate rock can be also used in the present invention. Specific examples of these include lime and calcium carbonate. In particular, it is preferable to first combine lime or a suitable lime-forming substance with the phosphoric acid reagent and then add this mixture to the other reagents. This concept is discussed in detail in the co-pending U.S. patent application Ser. No. 761,049, filed Jan. 21, 1977 by Harold V. Larson. This patent application is incorporated completely herein by reference. Calcium carbonate may also be used as a source of lime but the excess foaming in mixing the slurry containing this compound must be dealt with.

The prior art discloses numerous formulations and operating conditions for effecting defluorination of phosphate rock without fusion. For example, U.S. Pat. Nos. 2,893,834; 2,995,436; 2,995,437; 3,189,433; 3,292,995; and 3,364,008 as well as the above-mentioned U.S. patent application Ser. No. 761,049 each present formulations for preparing granular feed for the defluorination of fluorine-containing phosphate rock.

In particular, it is preferred to prepare a non-granulated feed slurry in which the weight ratio of CaO to $P_2O_5$ therein is in the range from about 1.01:1 to greater than about 1.06:1, depending on the amount of the acid insolubles and other impurities present in the phosphate rock and the other reagents. A suitable mixture of reagents that may be utilized to form the non-granulated feed slurry, employing relatively pure phosphate rock concentrate feed (above about 72% by weight BPL and less than about 6% by weight acid insolubles) will have proportions given in the following table:

TABLE I

| Component | Parts by Weight |
|---|---|
| High Grade Phosphate Rock Concentrate | 540–550 |
| Sodium Carbonate | 40–65 |
| Phosphoric Acid (24% to 32% by Weight) | 200–295 |
| Water | 100–140 |

Moreover, when less pure phosphate rock, such as rock containing in excess of 6% by weight up to about 10% by weight of acid insolubles, is employed as a starting material, additional phosphoric acid and lime as taught in co-pending U.S. patent application Ser. No. 761,049 may be also added. However, it should be understood that the present invention should not be limited to any particular proportions of reagents since the invention is primarily directed to adding phosphoric acid during the subsequent cooling step. Therefore, any proportions of reagents which when employed result in defluorinated phosphate rock granules that have a phosphorus content below about 18% by weight are encompassed by the present invention.

More in detail, a preferred embodiment of the present invention is illustrated in schematic form in the Figure. Feed slurry mixer 10, which is a suitable tank or other vessel provided with agitation means, is used to prepare the non-granulated feed slurry of fluorine-containing phosphate rock and other reactants. Phosphate rock, which is generally a fluorine-containing concentrate containing from about 65% to about 78% BPL by weight and up to about 10% by weight acid insolubles, and having a particle size all of which passes through a 35 mesh Tyler standard screen, is fed from a suitable hopper (not shown) through rock feed line 11 to feed slurry mixer 10. It is preferred to employ Florida phosphate rock, which generally contains less than about 1.5% by weight of $Al_2O_3$ and less than about 1.5% by weight of $Fe_2O_3$. However, phosphate rock from other sources, which are generally less pure than Florida phosphate rock concentrates, may be defluorinated satisfactorily in accordance with this preferred embodiment.

Sodium carbonate from a suitable hopper (not shown) is also fed to feed slurry mixer 10 through sodium carbonate feed line 12. The sodium carbonate employed in preparing the feed slurry is generally commercially available soda ash which contains greater than 99% by weight $Na_2CO_3$ (58% by weight $Na_2O$) and substantially all of the particles pass through a 35 mesh screen.

Acid slurry mixer 13, which is a suitable tank or other vessel provided with agitation means, is used to prepare an acid slurry for feeding to feed slurry mixer 10 through acid slurry feed line 14. The acid slurry is prepared by mixing phosphoric acid, lime and water in acid slurry mixer 13. Any phosphoric acid as defined above can be utilized herein. The phosphoric acid is stored in a suitable vessel (not shown) and fed through phosphoric feed line 15 to acid slurry mixer 13.

Lime or a suitable lime-forming substance is conveyed from a suitable hopper or tank (not shown) through lime feed line 16 to acid slurry mixer 13. Sufficient water is added to acid slurry mixer 13 through water feed line 17 to provide a slurry of phosphoric acid, lime and water having a specific gravity in the range of from about 1.20 to about 1.50, preferably from about 1.35 to about 1.38. If desired, a portion or all of the water can be added with the phosphoric acid. Alternatively, a portion or all of the water may be used to preform an aqueous lime slurry by conveying water from water feed line 17 through lime slurry water line 18 (shown in dotted form in the FIGURE) to lime feed line 16. Generally, such aqueous lime slurries have specific gravities in the range from about 1.1 to about 1.4 and preferably from about 1.2 to about 1.35. Furthermore, water may be instead added to the lime hopper (not shown) and the resulting aqueous lime slurry is conveyed through lime feed line 16 to acid slurry mixer 13.

The lime-phosphoric acid slurry, sodium carbonate and phosphate rock (and more water, if desired) are admixed in feed slurry mixer 10 in proportions described more fully above, especially Table I, and the resulting slurry is conveyed to granulation zone 19 through feed slurry line 20. Granulation zone 19 may be any suitable granulating or pelletizing device, such as rotary granulator, blunger, pug mill, or the like, which is capable of mixing and layering in granular form the components of the slurry on recycled solids from sources described more fully below. In particular, a bed of dry recycled solids is established in granulation zone 19 and the slurry from feed slurry mixer 10 is conveyed through feed slurry line 20 to a suitable nozzle or nozzles (not shown) in granulation zone 19 where the feed slurry is sprayed onto the moving bed of dry recycled solids. By this technique, the dry solids are coated with relatively thin successive coatings of the feed slurry, thereby forming wet granules containing a substantial portion of fluorine-containing phosphate rock. The size of these granules increases as they pass through granulation zone 19 and are conveyed through granulation zone discharge line 21 to drying zone 22.

Drying zone 22 may be any suitable dryer, such as a rotating dryer, fluidized bed dryer, or shelf dryer, capable of reducing the water content of the granules to the desired range. Generally, the free water content of the wet granules fed through granulation zone discharge line 21 can range from about 2% by weight to about 7% by weight, and, in turn, the free water content of the dried granules in drying zone discharge line 28 can range from 0% to about 1% by weight and the trapped or crystalline water content of the dried granules may be from 0% to about 3% by weight. If desired, the granulating and drying steps may be combined into a single granulator-dryer unit (not shown). Drying zone 22 may also be provided with a suitable dust collection means (not shown) which is capable of collecting finely divided phosphate rock particles, sodium carbonate, and the like, and conveying them through fines recycle line 27 to granulation zone 19.

The dry granules are conveyed from drying zone 22 through drying zone discharge line 28 to a suitable solids classification system such as that represented by screens 29. The classification screens 29 generally separates the dried granules into three fractions, i.e., product fraction, a fines fraction and an over-size fraction. The product fraction may have a particle size in the range of −8+18 mesh, and preferably, in the range of −10+16 mesh, but coarser or finer size ranges may be employed. For example, the product fraction may have a large size range such as from −4+40 mesh or a narrow size range such as −10+14 mesh. The over-size fraction consists of granules whose size is larger than upper mesh-size limit of the product range. The fines fraction consists of granules whose sizes are smaller than the lower mesh-size limit of the product range. Under normal operations when the product size is −10+16 mesh, the product fraction of the drying zone discharge is from about 65% to about 80% by weight. The over-size fraction is normally from about 2% to about 10% and the fines fraction is normally from about 20% to about 25% of the dryer discharge. In this normal fines fraction, about 15–20% by weight is of a size between −16+20 mesh and about 5–10% by weight is less than 20 mesh, said percentages based on amount of drying zone granule discharge.

After passing through the screens 29, the over-size fraction is conveyed through over-size fraction discharge line 30 to a feed crusher 31 or other crushing apparatus such as an impact mill. Feed crusher 31 generally comminutes the over-size fraction until all of the particles are of a product fraction size or fines fraction size. The resulting communited particles are recycled through feed line 32 to granulation zone 19.

The fines fraction separated in screens 29 is conveyed through fines fraction recycle line 33 to also help establish a moving bed of dry recycled solids in granulation zone 19. If desired, a portion of the product fraction also may be conveyed by means of diverter 70 to granulation zone 19 to further help establish this moving bed of recycled solids. This portion of the recycled product fraction may be from 0% to about 95% by weight, preferably from about 50% to 90% by weight. Instead of having three separate lines returning these recycled solids to the granulation zone 19, there may be one line and the three fractions may be combined before entering the granulation zone 19. In any event, the feed ratio of total recycled solids to solids in the feed slurry may range from about 11:1 to about 17:1. More preferably, in the range of from about 14:1 to about 16:1.

The unrecycled product fraction is conveyed through product feed line 34 to fluidized bed calciner 35. In the operation of fluidized bed calciner 35, air is conveyed from air feed line 36 or other air source through a suitable blower 37 to furnace 38 where it is mixed with combustion gases to form a gaseous mixture containing air and water vapor having a temperature in the range of from about 530° C. to about 880° C., and preferably from about 620° C. to about 700° C. This gaseous mixture is conveyed through combustion gas feed line 39 to the bottom of fluidized bed calciner 35 where it is admixed with a suitable fuel such as natural gas. Combustion of this mixture in fluidized bed calciner 35 produces a heated combustion gas containing water vapor in the range from about 15% to about 20% by weight, which fluidizes the product feed fraction fed to calciner 35.

Defluorination of the dry granules of unrecycled product fraction in fluidized bed calciner 35 is generally obtained by heating the granules to a temperature in the range from about 980° C. to about 1350° C. and preferably from about 1260° C. to about 1290° C. Hold-up time for the solids under these conditions in the fluidized bed calciner 35 generally ranges from about 3 to about 10 and preferably from about 4 to about 5 hours. Exhaust gases are removed continuously from fluidized bed calciner 35 through exhaust gas line 40 which conveys the gases to cyclone 41 or other suitable solid-gas separation units. The exhaust gases from fluidized bed calciner 35 not only contain finely divided particles of phosphate rock, soda ash, and the like, but also contain fluoride impurities in gaseous form. Cyclone 41 separates these components of the exhaust gas and conveys the fluorine-containing gases through fluorine gas line 42 to fluoride recovery unit 43. In fluoride recovery unit 43, the fluorine gases are scrubbed with water in the presence of a dilute hydrogen fluoride solution to form a more concentrated aqueous hydrogen fluoride solution, which is removed through fluoride product line 48. Exhaust gases from fluoride recovery unit 43 are conveyed through exhaust gas line 49 to waste.

After the above heating step, the defluorinated phosphate rock is conveyed from fluidized bed calciner 35 through solids discharge line 52 to fluidized bed cooler 51. In addition, finely divided particles of defluorinated phosphate rock removed in cyclone 41 are conveyed through cyclone discharge line 50 to cooler 51. This fluidized bed cooler 51 can be of any construction and size that is normally used for forming this type of bed of fluidized materials. Fluidized bed coolers are preferred over other types of coolers because it is easier to handle large amounts of hot materials in them. Air or any other suitable gas from a suitable source, preferably at ambient temperature, is conveyed through cooler blower 53 through cooler air line 54 to cooler 51 where the hot solids from fluidized bed calciner 35 are cooled to a temperature of less than about 150° C., and preferably below 75° C. Water (not shown) may be added to the cooler 51, preferably at the portion of cooler 51 closest to the entrance of the heated defluorinated particles, to aid in quickly reducing the temperature of the heated solids to around 400° C. or under. Such quick reduction of solids temperature is thought to be beneficial for maintaining the citric-solubility of the solids.

In accordance with the present invention, phosphoric acid is sprayed or otherwise applied to the fluidized solids in portions of cooler 51 where the temperature of these solids are from about 175° C. to about 400° C., preferably from about 350° C. to about 390° C. Sufficient phosphoric acid is sprayed on the solids to raise the average phosphorus content of the resulting product to at least 18% by weight, whereby the product is suitable for animal feed. Preferably, the present invention can be carried out on defluorinated granules which have a phosphorus content in the range of from about 16% by weight to below about 18% by weight; more preferably, from about 17% to below 18% by weight; and most preferably, from about 17.5% to below 18% by weight. Addition of increasing amounts of phosphoric acid according to the present invention may have the undesirable effect of increasing the hydroscopicity of the product. However, increasing the phosphorus content by about 0.50% in accordance with the process of the present invention has not shown any significant rise in product hydroscopicity. If desired, the amount of phosphoric acid added may exceed the 18% lower limit by any desired amount. Adding phosphoric acid to hot solids having a temperature above about 400° C. does not appear to increase the phosphorus content of the product. It is not exactly clear what happens at these elevated temperatures; however, it is believed that polyphosphate compounds which do not analyze as part of the phosphorus content are formed. Likewise, temperatures below about 175° C. are not desirable because liquid muds are formed in the fluidized bed. These muds are detrimental to the operation of the fluidized bed cooler. Temperatures in excess of about 175° C. are required for normal operation of the cooler whereby the added phosphoric acid (and water) are vaporized and exit either on the solid particles or in the exiting gas stream.

The phosphoric acid added at this cooling step can be any conventional commercial phosphoric acid as was employed above in the preceding mixing step. In fact, it may be preferable to use the same phosphoric acid source as used for the mixing step. Instead of phosphoric acid, any $P_2O_5$-bearing compound could be used. For example, $NaH_2PO_4$ made from phosphoric acid and sodium carbonate may be used. Therefore, it should be understood that the term "phosphoric acid" as used in the specification and claims includes equivalent $P_2O_5$-bearing compounds. The rate of addition of the phosphoric acid onto the hot solids will depend upon the amount of increased phosphorus content desired. For instance, addition of about 1.0 gallon per minute of phosphoric acid (30% by weight $P_2O_5$) onto hot solids added to cooler 51 at a rate of around 5 tons per hour will raise the average phosphorus content of the product about 0.5%.

After this cooling step, the cooled defluorinated phosphate rock granules are recovered. Preferably, this is accomplished by a screening operation. The cool solids from cooler 51 are conveyed through cooler product line 55 to screens 56 or other suitable solids classification equipment. Screens 56 separate the cooled product into three fractions, i.e., a coarse fraction, a fines fraction and a defluorinated phosphate product fraction.

The coarse fraction, which is generally retained on about a 6 mesh screen is conveyed through coarse product discharge line 57 to product crusher 58 or other suitable comminution device, where the coarse product is comminuted to pass a 10 mesh screen. The comminuted product is conveyed through comminuted product line 59 to product screens 56.

The fines fraction of defluorinated phosphate product is conveyed from product screens 56 through defluorinated product fines line 60 to storage for use as a component of animal feeds. In addition, fine particles of defluorinated phosphate product are separated from cooler 51 through cooler fines fraction line 61 and are conveyed to product fines cyclone 62. Exhaust gases from product fines cyclone 62 are discharged through cyclone exhaust line 63 to waste. Product fines are discharged from product fines cyclone 62 through product fines discharge line 64 and conveyed to product screens 56.

The defluorinated phosphate product fraction from screens 56 may be any desired size suitable for animal feed components. Generally, the product fraction is in the range −10+200 mesh, but a product fraction within the range −10+20mesh is preferably obtained. If desired, fines (−200 mesh) up to about 5% by weight may be included in the product fraction.

The defluorinated phosphate product fraction from screens 56 and the defluorinated phosphate product fines fraction from screens 56 each contain less than about 1 part fluorine per 70 parts of phosphorus by weight. When necessary to provide acceptable animal feed, these products contain at least about 18% by weight phosphorus.

The following example is presented to define the invention more fully without limiting the scope of the invention. All parts and percentages are by weight unless otherwise specified.

EXAMPLE I

The process improvement of the present invention was employed to correct a process upset on the following defluorination process. The conditions of the normally run process are given below.

The process of this invention was employed to defluorinate a fluorine-containing phosphate rock having the following approximate analysis:

TABLE II

| Component | % By Weight |
|---|---|
| $P_2O_5$ | 33.0 |
| CaO | 48.0 |
| $Al_2O_3$ | 0.8 |
| $Fe_2O_3$ | 1.1 |
| A.I.* | 6.5–8.75 |
| $R_2O_3$** | 1.3 |
| Non-Volatiles*** | 90.70–92.95 |
| $H_2O$ | 1.0 |

*Acid insolubles by the Boric-Perchloric Technique - mainly silica and silica-phosphate complexes.
**Miscellaneous metal oxides, other than iron and aluminum oxides.
***Non-Volatiles = sum of the above items.

Phosphoric acid, sodium carbonate (in the form of soda ash) and water were added to this fluorine-containing phosphate rock and a defluorination system of the type shown in the FIGURE was employed, except no lime was added and the phosphoric acid and water were added directly to feed slurry mixer 10 instead of acid slurry mixer 13 as shown in the FIGURE. The phosphoric acid had an approximate analysis as set forth below in Table III.

TABLE III

| Component | % By Weight |
|---|---|
| $P_2O_5$ | 29.3 |
| CaO | 1.0 |
| $Al_2O_3$ | 0.8 |
| $Fe_2O_3$ | 1.1 |
| $SiO_2$ | 1.2 |
| $Na_2O$ | 0.2 |
| Non-Volatiles* | 33.6 |
| $H_2O$ | 49.5 |
| $H_2SO_4$ | 2.0 |

*Non-Volatiles = sum of the above items.

Phosphoric acid was added to feed slurry mixer 10 at a varying rate of about 240–290 parts per hour, along with about 540–550 parts per hour of the above-identified fluorine-containing phosphate rock, about 40–65 parts per hour of sodium carbonate, and about 100–140 parts per hour of water. The resulting non-granulated feed slurry containing about 27.5% water by weight and having a $CaO/P_2O_5$ weight ratio of about 1.025–1.050. Moreover, this slurry had a pH of about 5.0–5.5 and a specific gravity of about 1.890–1.910.

This non-granulated feed slurry was fed to granulation zone 19, which was a blunger having two rotating shafts with perpendicular spikes. The blunger admixed a bed of previously prepared dry granules of phosphate rock particles (recycled solids) with the feed slurry from feed slurry mixer 10, which was fed to the blunger at a rate of from about 20–35 gal./min. The temperature of the mixture in the blunger was approximately 60°–70° C. and the weight ratio of recycled solids to solids in the slurry was about 14–16:1.

The resulting wet granules from the blunger (about 6% by weight water) were charged to a rotary dryer heated by co-current flowing air having an inlet temperature averaging about 450° C. and an outlet temperature averaging about 90° C. The free water content of the dry particles was about 0.5% by weight and total water content (containing trapped or crystalline water) was about 3% by weight.

The dry granules were classified by screening to separate out a product fraction having a size of −10+16 mesh. The over-sized particles larger than 10 mesh were crushed in an impact mill whereby approximately all of the crushed over-size had a reduced size of less than 16 mesh. This crushed over-size amounted to about 2–10% by weight of the solids discharged from the dryer. The fines fraction amounted to 20–25% by weight of the dryer discharge. About 15–20% by weight of the dryer discharge was in the size range of −16+20 mesh and about 5–10% by weight was in the size range of −20 mesh. The product fraction amounted to about 65–80% by weight of the dryer discharge.

The product fraction was fed into a gate-type diverter 70 wherein about 90% by weight of this fraction was diverted back for recycle into the blunger. The crushed over-size fraction, fines fraction and diverted products fraction were combined together to form one recycle feed stream. As stated above, the weight ratio of recycled solids to solids in the feed slurry was about 14–16:1.

The undiverted product fraction was fed to a fluidized bed calciner 35 employing air at a pressure of 5 to 6 psig and temperature of about 650° C. for combustion with natural gas. The combustion gases used for fluidizing the bed had a temperature of from 1260° C. to about 1320° C. and flowed through the bed at the rate of about 5 to about 7 feet per second. The average retention time of the dry granules in the fluidized bed calciner 35 was from about 4 to about 5 hours.

Effluent gas from the fluidized bed calciner 35 was conveyed to cyclone 41 and the resulting gas was conveyed to a fluorine recovery unit. The separated dust particles were conveyed to cooler 51 along with the defluorinated solid particles removed from the central portion of fluidized bed calciner 34.

The product of fluidized bed calciner 35 was allowed to enter a 4-sectional fluidized bed cooler 51 at a rate of about 5.3 tons per hour. The calcined product had the following analysis:

$P_2O_5$ = 40.47% by weight
CaO = 42.20% by weight
P = 17.66% by weight and had the following approximate screen analysis (Tyler standard mesh):

+6 mesh: 10.7%
+8 mesh: 49.1%
+10 mesh: 85.0%
+12 mesh: 92.9%
+16 mesh: 98.1%
+20 mesh: 99.1%

Cooler 51 was approximately 2 feet wide, 8 feet long and 5 feet high. It was divided into four equal sections by decreasing-size overflow partitions from the floor of the cooler. Compressed air at ambient temperature was pumped into the bottom of the fluidized bed at a pressure of about 2 psig and at a rate of 9600 cubic ft./min. The calcined product was allowed to gradually flow through all four sections with an average total retention time in the cooler for about 20 minutes. The temperature of the calcined product when it entered cooler 51 was approximately 1260°–1290° C. and while in the first section of the cooler, the product temperature was approximately in the range of 175° C. to 400° C. The product temperature when leaving the cooler was approximately 65° C.

In the first section of the cooler, cooling water was sprayed down the product so as to maintain a bed temperature as stated above in the first cooler section, and a stream of wet-process phosphoric acid, having a 1.356 specific gravity, was also added to the first section of the fluidized bed cooler at a rate of 0.6 gpm to 0.9 gpm for a period of about 5 hours. The added phosphoric acid had the same approximate analysis as given in Table II.

The phosphoric acid was added using four spray nozzles, arranged so as to distribute the acid evenly over the total surface of this first section of the fluidized bed. The $P_2O_5$ content of the cooled calcined, defluorinated phosphate rock granule was raised from 40.47% by weight average to an average of 41.22% $P_2O_5$. The phosphorus content of the product was raised from an unacceptable 17.66% by weight to an acceptable 18.0% by weight, which meets industry standards for animal feed.

After exiting from cooler 51, the cooled product was conveyed to a set of screens which separated the cooled product into three fractions: course-sized being +6 mesh in size, product-sized being −6+200 mesh, and fines-sized of less than 200 mesh. The course-sized was crushed and returned to the same set of screens for screening again. Two products therefore were obtained, −6+200 mesh defluorinated phosphate rock granules and −200 mesh defluorinated phosphate rock fines. Both products are useful as animal feed.

The phosphate content of the defluorinated granules was 18% by weight and the fluorine content ranged from 0.06% to 0.16%. The available $P_2O_5$, as determined by solubility in hydrochloric acid, was approximately 98.9% by weight; as determined by solubility in citric acid was about 98.6–98.7% by weight and, as determined by solubility in neutral ammonium citrate, was about 90.3% by weight.

What is claimed is:

1. In a process for preparing defluorinated phosphate rock granules for use as an animal feed which comprises:

(a) forming a mixture of fluorine-containing phosphate rock, phosphoric acid, sodium carbonate and water,
(b) granulating the resulting mixture,
(c) heating the resulting granules to a temperature to defluorinate said fluorine-containing phosphate rock without fusion whereby sufficient fluorine is evolved to produce defluorinated phosphate rock granules, said defluorinated phosphate rock granules having a phosphorus content of less than 18% by weight, (d) cooling said heated defluorinated phosphate rock granules in a fluidized bed, and (e) recovering said cooled defluorinated phosphate rock granules, wherein said improvement comprises:

adding phosphoric acid to said defluorinated phosphate rock granules during said cooling step when said granules are at a temperature from about 175° C. to about 400° C., the amount of said added phosphoric acid being sufficient to raise the phosphorus content of said granules to at least 18% by weight.

2. The process of claim 1 wherein the temperature of said defluorinated phosphate rock granules during said cooling step is from about 350° C. to about 390° C. when said phosphoric acid is added.

3. The process of claim 1 wherein water is added to said fluidized bed cooler to aid in reducing the temperature of said heated defluorinated phosphate rock granules to below about 400° C.

4. The process of claim 1 wherein said heated defluorinated phosphate rock granules have a phosphorus content in the range from about 16% to below 18% by weight prior to adding said phosphoric acid.

5. The process of claim 4 wherein said heated defluorinated phosphate rock granules have a phosphorus content in the range from about 17% to below 18% by weight prior to adding said phosphoric acid.

6. The process of claim 5 wherein the temperature of said defluorinated phosphate rock granules during said cooling step is from about 350° C. to about 390° C. when said phosphoric acid is added.

7. The process of claim 6 wherein water is added to said fluidized bed cooler to aid in reducing the temperature of said heated defluorinated phosphate rock granules to below about 400° C.

8. The process of claim 7 wherein said heated defluorinated phosphate rock granules have a phosphorus content in the range from about 17.5% to below 18% by weight prior to adding said phosphoric acid.

9. The process of claim 8 wherein lime is added during step (a).

10. The process of claim 9 wherein said lime is admixed with said phosphoric acid to form a lime-acid slurry and said lime-acid slurry is mixed with the other components of said mixture.

* * * * *